June 2, 1953 H. A. ANDRESEN 2,640,678
FLUID TRANSLATING DEVICE
Filed Dec. 22, 1947 3 Sheets-Sheet 2

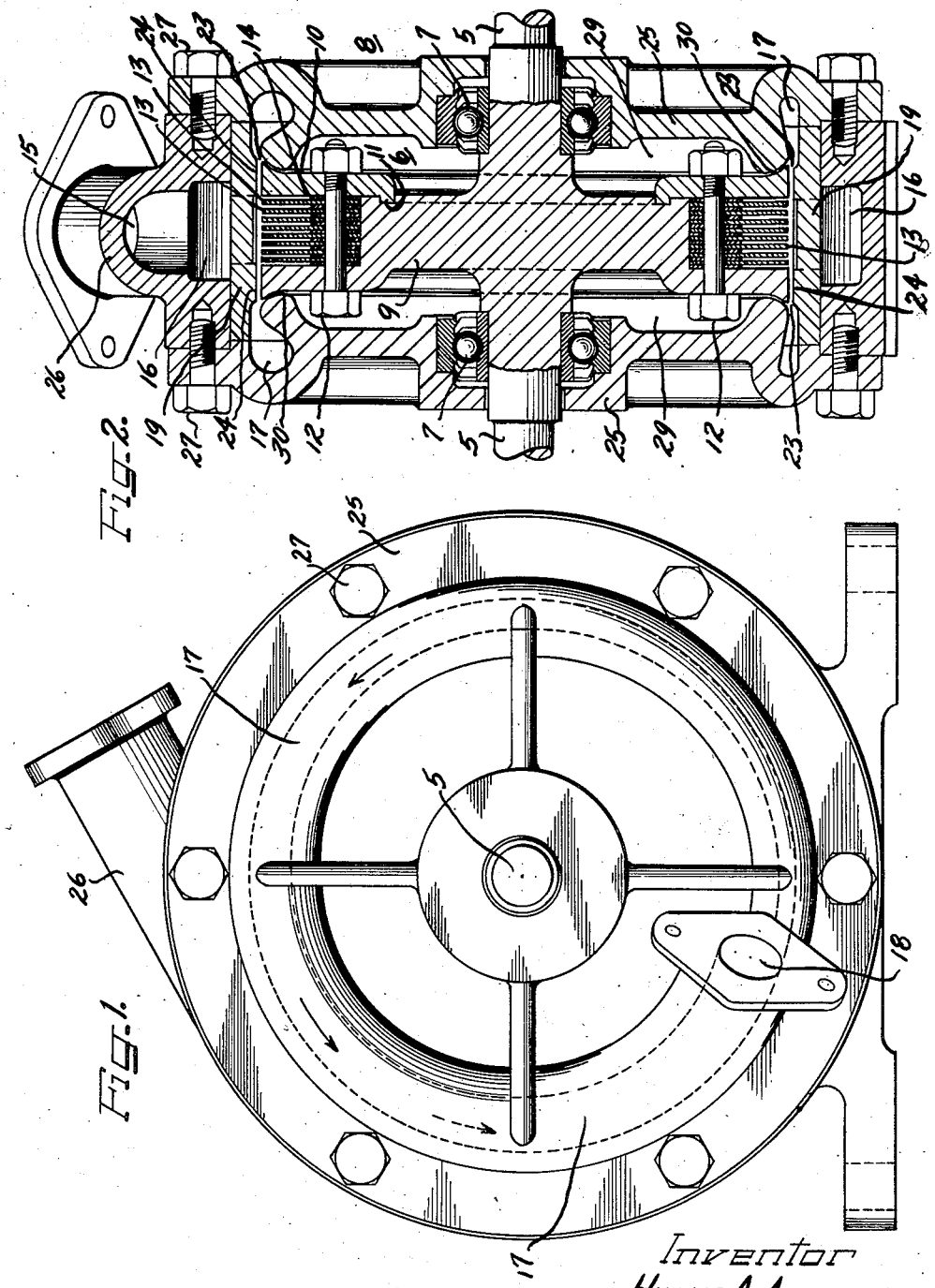

Inventor
HILMAR A. ANDRESEN
by Attys.

June 2, 1953  H. A. ANDRESEN  2,640,678
FLUID TRANSLATING DEVICE
Filed Dec. 22, 1947  3 Sheets-Sheet 3
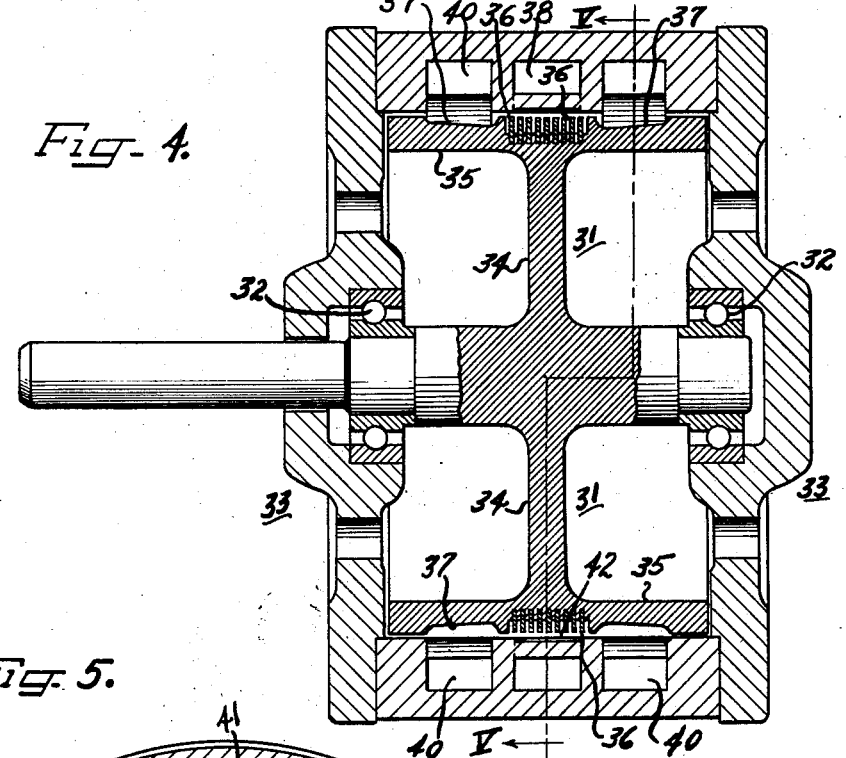
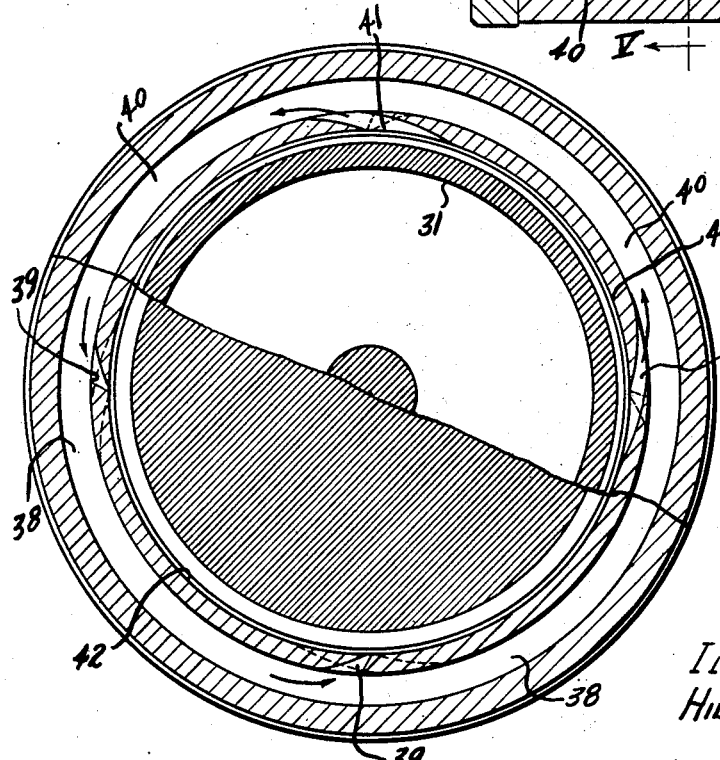
Inventor
HILMAR A. ANDRESEN Patented June 2, 1953

2,640,678

UNITED STATES PATENT OFFICE 2,640,678

FLUID TRANSLATING DEVICE

Hilmar A. Andresen, Chicago, Ill.

Application December 22, 1947, Serial No. 793,188

2 Claims. (Cl. 253—40)

My invention relates to fluid translating devices wherein energy of motion of a fluid medium is converted to mechanical torque or mechanical torque is exerted to pump a fluid.

In one method of converting the energy of a working fluid such as air, gas, water, etc. to usable mechanical torque, the fluid is injected tangentially to a group of annular vanes, the vanes being closely spaced to cause maximum frictional engagement with the fluid. The vanes are mounted on a rotor structure so that the resultant frictional forces exerted between the fluid and the vanes cause torque to be exerted on the rotating structure. This torque may then be communicated to a shaft and used to do work, as, for example, by operating a fan or a similar device.

It is well recognized that maximum efficiency and economy in a fluid translating device requires that losses due to friction and turbulence associated with the passage of fluid therethrough be minimized. Thus, the fluid should have no sudden changes in velocity imparted to it by striking parts moving at different velocities or sudden changes in direction of motion. Furthermore, it is well recognized that the cost and reliability of a fluid translating device is unfavorably influenced if pistons, paddles, buckets or similar parts are required as production of such parts necessarily involves expensive machining operations and they are subject to wear.

It is an object of my invention to provide an improved fluid translating device wherein the fluid follows a continuous path having no sudden changes in direction of flow.

Another object of my invention is to provide a fluid translating device wherein the fluid stream does not impinge upon surfaces moving relative thereto, to the end that frictional losses from this cause are minimized.

Yet another object of my invention is to provide an improved fluid translating device having features of construction, combination and arrangement whereby a minimum number of easily produced parts are utilized in a simple and effective construction to minimize the cost of production and maintenance and to provide maximum economy of materials.

A further object of my invention is to provide a fluid translating device having no blades, buckets or other parts subject to wear by the fluid medium so that a contaminated fluid may be passed therethrough without damage or excessive wear.

Still another object of my invention is to provide a fluid translating device operable as a motor to convert the energy contained in the fluid to useful mechanical energy and wherein frictional losses are minimized by utilizing the inherent centrifugal force imparted to the fluid as an aid to exhaust.

The novel features which I believe to be characteristic of my invention are set forth with particularity in the appended claims. My invention itself, both as to its organization and manner of operation, together with further objects and advantages thereof, may best be understood by reference to the following description taken in connection with the accompanying drawing.

In the drawing:

Figures 1, 2 and 3 are a side elevation, axial cross-section and transverse cross-section of one embodiment of my invention;

Figures 4 and 5 are axial and transverse cross-sections, respectively, of another embodiment thereof; and Figure 6 is a detailed view of the vane structure of the embodiment of Figures 4 and 5.

Figure 3:
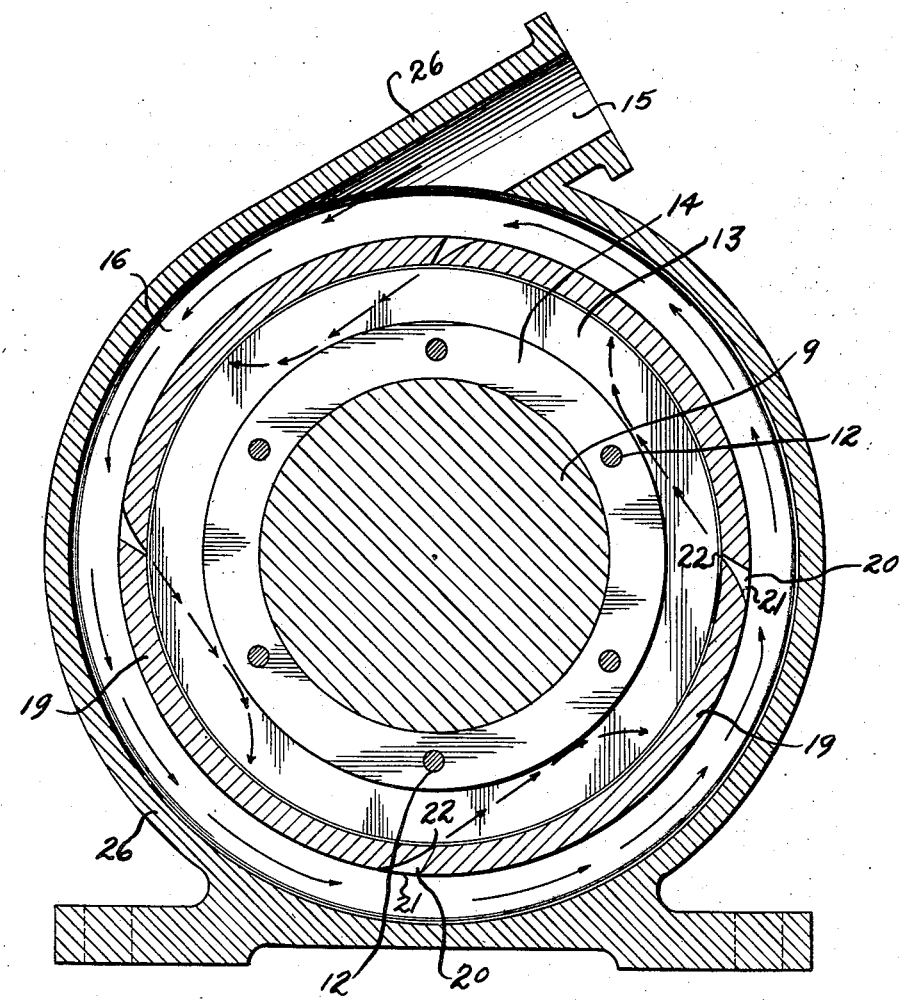

Referring now to Figures 1, 2 and 3, 5 is a shaft upon which the rotor, shown generally at 6, is mounted. Shaft 5 is supported by bearings 7 so as to permit rotation about the stationary structure shown generally at 8. The rotor, shown generally at 6, consists of a flange portion 9 which is cast integrally with shaft 5 so as to be connected thereto. Alternatively, portion 9 may be welded or otherwise mounted on shaft 5. Clamp member 10 is adapted to fit in recess 11 in member 9 and is held by bolts 12 to anchor vanes 13 and washers 14 in place. Bolts 12 are spaced about the periphery of rotor 6 so that a uniform axial pressure is exerted on vanes 13 and washers 14, thus rigidly to attach them to the rotating structure and cause force exerted on vanes 13 to appear as torque on shaft 5.

It is the purpose of inlet passage 15, inlet header 16, outlet header 17 and outlet passage 18 to control and direct the working fluid as it passes through the translating device. To this end, inlet passage 15 is arranged to inject the working fluid in a tangential direction relative to the vanes 13 of rotor 6 and inlet header 16 is arranged as an annular passage. Annular member 19 is located on the inside of the inlet header 16 so that the fluid passing from inlet passage 15 tends to circulate through the inlet header 16 in a direction tangential to member 19. This is shown by the arrows of Figure 3. It is the purpose of Venturi ports 20 to cause fluid to flow from the inlet header 16 to the annular vanes 13 in a direction tangential to the motion thereof. The spaced ports 20 are preferably provided at equal angular distances about the periphery of member 19 so as to equalize the forces about shaft 5. The fluid is therefore passed from the inlet header 16 through ports 20 onto vanes 13 as shown in the section of Figure 3.

Venturi ports 20 are arranged to impart to the working fluid a high velocity in direction tangential to the vanes 13. To this end, each port has a relatively large area inlet section 21 and a relatively small area outlet section 22. Consequently as the fluid passes through port 20 the pressure head which it has in storage space 16 is partially converted to a velocity head as the fluid enters the region of vane 13 and a correspondingly high velocity is imparted thereto.

Fluid is exhausted from the device of Figures 1, 2 and 3 by passage through exhaust passageway 23 to outlet header 17 and outlet passage 18. Exhaust passageway 23 consists of an opening between the outside periphery of rotor 6 and inner surface 24 of stator 8. This opening is necessary in any event to avoid engagement of these parts and is merely made of such size as to enable passage of the working fluid therethrough. The forces causing the fluid to pass from the region of vanes 13 through exhaust passageways 23 to the exhaust header 17 are developed by the centrifugal forces associated with the rotation of the fluid about the shaft. These forces are in the radial direction and consequently cause pressure to be built up along the inner surface of member 19 as the fluid begins to follow a curved path rather than the straight line path associated with tangential injection thereof from ports 20. This pressure causes the fluid to be forced transversely through passages 23 to the lower pressure area of outlet header 17. When it reaches this area the fluid passes through the outlet header 17 with a rotational motion and is exhausted from outlet passageway 18.

It will be observed that the transverse or axial motion of the fluid as it passes through exhaust passageway 23 takes place while the fluid has a peripheral component of velocity as there are no obstructions to peripheral motion in this passageway. Hence, the peripheral velocity due to rotation of vanes 13, together with the initial velocity of the fluid as it is injected through Venturi ports 20, is not suddenly changed as the fluid passes through passages 23 and exhaust header 17 and a smooth flow of fluid thus obtained. It will further be noted that when the fluid has exhausted into outlet header 17, the fluid continues to have a peripheral component of velocity which carries it around that space as shown in the dotted arrows of Figure 1 to cause exhaustion from outlet passage 18. Furthermore, outlet space 17 is provided with increased cross-sectional area as the periphery of the stator, shown generally at 8, is traversed, thus causing the area to correspond to the amount of fluid being moved therethrough and maintaining the fluid velocity substantially constant.

The stator portion, shown generally at 8, includes two closure members 25, each forming a portion of outlet header 17 and being attached to member 26 by bolts 27. Closure members 25 are further shaped to coact with member 19 which contains Venturi ports 20 and are arranged to coact with vanes 13 to produce exhaust passageways 23 of the desired size. As shown in the figures, member 26 contains inlet passage 15 and is arranged to coact with closure members 25 to form exhaust headers 17.

The passage of fluid through the device shown in Figures 1, 2 and 3 may now be traced. The fluid first enters an inlet passage 15 from a suitable storage container where it is maintained at a high pressure. The fluid then moves to header 16 where the tangential motion imparted from inlet passage 15 causes peripheral velocity about passageway 16. This peripheral velocity is increased as the fluid passes through Venturi ports 20 and the high pressure associated with the fluid in inlet passages 15 and header 16 converted to a correspondingly high velocity of the fluid as it emerges from the ports. When the fluid emerges in a tangential direction from ports 20 it passes across vanes 13, imparting motion to rotor 6 by reason of the frictional engagement with these vanes. Ports 20 cause a slight radial component of velocity in order to cause the fluid to pass to a predetermined depth within the vanes 13. As the fluid partakes of the motion of the vanes it acquires a peripheral motion and a corresponding centrifugal force is developed causing it to tend to move radially and exert pressure against the inner surface of member 19. The resultant pressure forces the fluid through exhaust passages 23 to exhaust header 17 where its own velocity forces it to outlet passage 18 from which it is exhausted to the atmosphere or other suitable storage container.

It will be observed that in the above cycle of operation there is no point wherein the fluid is subjected to a sudden change in direction of flow. This is in marked contrast to fluid translating devices of the frictional engagement type previously developed for these have been based on exhaustion of the working fluid from the center of the rotor in somewhat the same manner as a conventional centrifugal pump. In this case, the exhaust operation not only is opposed to the natural flow of the fluid which is tangential rather than axial but also requires that a radial component of velocity be imparted to the fluid instead of the tangential component naturally associated with the motion. It will further be observed that in the construction of the present invention no passageways for axial fluid flow are required in the rotor member so that rotor 6 may be made of solid and strong construction and without expensive machining operations.

Vanes 13 coact with the working fluid injected from Venturi ports 20 to cause the vanes 13 to tend to rotate at a velocity corresponding to the tangential velocity of the working fluid. To the end that this is most effectively accomplished, these vanes are located very close together and are of minimum thickness so that a maximum portion of the space is available for fluid flow and a maximum surface is presented frictionally to engage such flow. This frictional engagement may be further improved by arranging vanes 13 to have a wavy configuration in the peripheral direction.

One of the features of the embodiment of this invention shown in Figures 1, 2 and 3 is the inherent low fluid pressure existing in the area 29 contained by the stator 8 and rotor 6. This results from the aspirator action associated with passages 30. Any fluid contained in area 29 has a rotational velocity imparted to it by frictional engagement between rotor 6 and hence tends to rotate with that rotor. However, this rotation produces centrifugal forces which tend to cause radial motion thereof and a correspondingly increased pressure with radius. This causes the entrained fluid to pass through passages 30 into the outlet header 17 and passages 18, thus producing a low pressure within area 29. As is well known, this low pressure produces substantially reduced windage resistance to the rotation of rotor 6, particularly with respect to such extending surfaces as are presented by bolts 12. In this fashion, inherently low windage resistance and low windage losses are achieved.

Figures 4 and 5 show an alternate embodiment of this invention, Figure 4 showing a partial axial cross-sectional view thereof and Figure 5 showing a section through line V—V of Figure 4. In these figures, the rotor element, shown generally at 31, is supported by bearings 32 on the stator structure shown generally as 33. As shown in Figure 4 rotor 31 consists of web 34 having flanged portion 35 upon which are mounted vanes 36 and having recessed portions 37. Coacting with this rotor member, stator 33 has fluid inlet header 38 in communication with vanes 36 by Venturi ports 39. In addition, stator 33 has outlet headers 40 with ports 41 in communication with the recesses 37 in rotor 31.

Figure 6 is a developed view of a portion of the rotor 31 showing how the vanes 36, Fig. 4, may be corrugated to increase the area thereof exposed to passage of fluid. These corrugations are in the direction of the axis of rotor 31 and are transverse to the direction of motion of the fluid. In this fashion increased frictional engagement between the fluid and the vanes is achieved without the use of additional vanes or a rotor of greater diameter.

In the structure of Figs. 4 and 5 the passage of the fluid may be traced from the source of supply to the inlet passage 38 from which the fluid passes through Venturi ports 39 to acquire a high velocity tangential to vanes 36 by reason of its initial high pressure. The fluid partakes of the rotary motion of vanes 36 and the resultant centrifugal force builds up pressure at the under surface 42 of stator 33, thereby causing the fluid to be forced in the axial direction toward recesses 37. The fluid then passes from the recesses 37 to the outlet headers 40 through ports 41 and is ejected to the exhaust reservoir or to the atmosphere.

As in the case of the embodiment described with reference to Figs. 1, 2 and 3, the fluid in passing through the device of Figs. 4 and 5 encounters no sudden velocity changes. The motion in inlet passageways 38 are tangential to vanes 36 and ports 39 impart a similar tangential motion so that no change in direction is associated with the passage of the fluid through these ports. Similarly, the direction of motion of the fluid while it is in engagement with vanes 36 is circumferential and at any particular point is tangential to these vanes so that passage through ports 41 to the outlet passageway 40 merely permits the fluid to flow in the natural direction, namely, tangentially.

While I have described my invention in terms of a fluid motor wherein the energy of a fluid is imparted to vanes and thus frictionally produces mechanical torque, the principles thereof may be applied to a fluid pump, wherein mechanical energy is applied and the energy condition of a fluid is increased. Thus, in the embodiment shown in Figures 1, 2 and 3, if the rotor 6 is rotated in the counter-clockwise direction, vanes 13 frictionally engage the fluid near them and will impart tangential velocity thereto. The centrifugal force associated with this velocity will produce pressure under member 19 in exactly the same manner as described above with reference to fluid motor action, thereby causing the fluid to move into outlet passages 22 and 23. However, the low pressure at the opening of Venturi ports 20 associated with the action of vanes 13 in the moving fluid thereunder, causes the fluid to be drawn through these ports from inlet header 16 and passages 15. Thus, the system acts as a pump to remove fluid from the inlet passageway and pass it to the exhaust passageway. It should be observed that with pump action, the same reinforcing effects takes place as with motor action so that the centrifugal force tends to move the fluid along the passageways in the same manner as described above with reference to the motor. This is in marked contrast to the situation existing in the case of fluid translating devices having an axial outlet system because in this case the centrifugal force produces pressure in opposition to the direction of fluid flow.

A further feature of my invention resides in the absence of buckets or similar specially shaped devices in the path of the working fluid. Thus, there are no moving parts subjected to wear from the fluid passing through the device. This feature is particularly desirable when the air or other medium passed through the device contains impurities, such as dust, which would soon wear buckets or other members upon which it impinges down to an ineffective condition.

It will be observed that the direction of motion of the fluid as it passes through the exhaust header and exhaust passages is tangential with respect to the motion of the rotor structure. This permits construction of an effective multi-stage device, inasmuch as the exhaust header of one stage may be connected to the inlet header of a succeeding stage. In the case of a motor succeeding stages would, of course, have vanes of smaller radius so that the reduced velocity of fluid flow with respect thereto would still exceed the normal velocity of the vanes and hence would impart further motion thereto. In the case of a pump succeeding stages would have larger diameters.

While I have shown and described particular embodiments of my invention, it will of course be understood that I do not wish to be limited thereto, since many modifications in the structure disclosed may be made without departing from the spirit and scope thereof. I, of course, contemplate by the appended claims to cover any such modifications as fall within the true spirit and scope of my invention.

I claim as my invention:

1. A fluid motor comprising, a casing having a generally cylindrical pumping chamber, an annular inlet header around said chamber, said casing having a peripheral inlet providing a passageway intersecting said annular inlet header tangentially and discharging a jet of fluid tangentially into said inlet header, a nozzle ring between said header and said chamber having a plurality of circumferentially spaced venturi nozzles directing fluid from said header into said chamber, each of said nozzles being provided in said nozzle ring opening into said header and into said chamber in tangential alignment and directing fluid from said header into said chamber tangentially, a rotor journaled for rotation in said casing, a plurality of annular impeller vanes arranged in closely spaced longitudinal alignment on said rotor for rotation in said chamber, said casing having means providing an annular outlet header adjacent said pumping chamber at the periphery thereof, and means providing an annular outlet passageway between the outer periphery of said rotor and said casing receiving fluid from between said vanes and communicating same to said outlet header, whereby the fluid moving through said pump is not subjected to abrupt changes in direction of flow.

2. A fluid motor as defined in claim 1 wherein said rotor impeller vanes comprise a plurality of spaced apart disks rotatable inside of said nozzle ring and each having corrugations providing undulations to increase the fluid impact area of said vanes.

HILMAR A. ANDRESEN.

References Cited in the file of this patent

UNITED STATES PATENTS

| Number | Name | Date |
|---|---|---|
| 525,793 | McElroy | Sept. 11, 1894 |
| 777,832 | Benjamin | Dec. 20, 1904 |
| 798,577 | Fiske | Aug. 29, 1905 |
| 1,058,121 | Weller | Apr. 8, 1913 |
| 1,208,888 | Anderson | Dec. 19, 1916 |
| 2,087,834 | Brown et al. | July 20, 1937 |
| 2,289,231 | Auger et al. | July 7, 1942 |

FOREIGN PATENTS

| Number | Country | Date |
|---|---|---|
| 5,219 | Great Britain | Mar. 13, 1905 |
| 18,807 | Great Britain | 1894 |
| 362,238 | France | 1906 |
| 363,684 | France | May 11, 1906 |